(12) United States Patent
Hoppe

(10) Patent No.: US 7,965,297 B2
(45) Date of Patent: Jun. 21, 2011

(54) PERFECT HASHING OF VARIABLY-SIZED DATA

(75) Inventor: Hugues Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 11/763,279

(22) Filed: Jun. 14, 2007

(65) Prior Publication Data

US 2007/0245119 A1  Oct. 18, 2007

Related U.S. Application Data

(63) Continuation-in-part of application No. 11/405,953, filed on Apr. 17, 2006, now Pat. No. 7,619,623.

(51) Int. Cl.
*G06F 12/00* (2006.01)
(52) U.S. Cl. ............... 345/564; 345/503; 345/565
(58) Field of Classification Search .............. None
See application file for complete search history.

(56) References Cited

U.S. PATENT DOCUMENTS

| | | | |
|---|---|---|---|
| 5,123,245 A * | 6/1992 | Vilenius et al. ............. | 60/596 |
| 5,490,258 A | 2/1996 | Fenner | |
| 5,526,504 A | 6/1996 | Hsu | |
| 5,692,177 A | 11/1997 | Miller | |
| 5,893,086 A | 4/1999 | Schmuck | |
| 6,014,733 A * | 1/2000 | Bennett ................. | 711/216 |
| 6,115,802 A * | 9/2000 | Tock et al. ............ | 711/216 |
| 6,216,199 B1 * | 4/2001 | DeKoning et al. .......... | 711/3 |
| 6,654,868 B2 | 11/2003 | Tamatsu | |
| 6,765,584 B1 | 7/2004 | Wloka | |
| 6,795,080 B2 | 9/2004 | Lavelle | |
| 6,873,343 B2 | 3/2005 | Chui | |
| 7,146,371 B2 * | 12/2006 | Hofstee et al. ............ | 1/1 |
| 7,158,141 B2 | 1/2007 | Chung | |
| 2003/0128876 A1 * | 7/2003 | Yamaguchi ............ | 382/190 |
| 2004/0064483 A1 | 4/2004 | Bulka et al. | |
| 2004/0117600 A1 | 6/2004 | Bodas et al. | |
| 2004/0227767 A1 | 11/2004 | Baroncelli et al. | |
| 2005/0219624 A1 | 10/2005 | Zavitaev | |
| 2006/0044317 A1 | 3/2006 | Bourd et al. | |
| 2006/0103665 A1 | 5/2006 | Opala et al. | |

OTHER PUBLICATIONS

Benson, D., and J. Davis, Octree textures, SIGGRAPH '02, 2002, pp. 785-790.
Blinn, J., How to solve a cubic equation, Part 2: The 11 Case, IEEE CG&A, 2006, vol. 26, No. 4, pp. 90-100.
Blythe, D., The Direct3D 10 system, Proc. of ACM SIGGRAPH HDR and systems, Jul. 2006, pp. 724-734, vol. 25, No. 3.

(Continued)

*Primary Examiner* — Said Broome
(74) *Attorney, Agent, or Firm* — Lyon & Harr, LLP; Mark A. Watson

(57) ABSTRACT

A "Variable-Rate Perfect Hasher" maps sparse variable-rate data of one or more dimensions into a hash table using a perfect hash function. In various embodiments, perfect hash tables are populated by first computing offset table address for each data point of a domain of sparse variable-rate data elements. Offset vectors are then computed for each offset table address based in part on the size of each data element by evaluating offset vectors in order of a sum of the data point addresses mapping to each offset vector. These offset vectors are then stored in the offset table. For each data point, the corresponding offset vector is then used to compute a hash table address. Data elements are then perfectly hashed into the hash table using the computed hash table addresses. The resulting hash tables support efficient random access of the variable-sized data elements stored therein.

20 Claims, 6 Drawing Sheets

OTHER PUBLICATIONS

Brain, M., and A. Tharp, Perfect hashing using sparse matrix packing, Info. Sys., 1990, pp. 281-290, vol. 15, No. 3.

Cantlay, I. Mipmap-level measurement, GPU Gems II, 2005, pp. 437-449.

Carpenter, L., The A-buffer, an antialiased hidden surface method, ACM SIGGRAPH, 1984, pp. 103-108.

Czech, Z., G. Havas, and B. Majewski, Perfect hashing, Theoretical Computer Science 1997, pp. 1-143, vol. 182.

Debry, D., J. Gibbs, D. Petty, and N. Robins, Painting and rendering on unparameterized models. ACM SIGGRAPH, 2002, pp. 763-768.

Fox, E., L. Heath, Q. Chen, and A. Daoud, Practical minimal perfect hash functions for large databases, 1992, CACM, pp. 105-121, vol. 33, No. 1.

Fredman, M. L., J. Komlós, E. Szemerédi, Storing a sparse table with 0(1) worst case access time, J. of the ACM (JACM), Jul. 1984, pp. 538-544, vol. 31, No. 3.

Frisken, S., R. Perry, A. Rockwood, and T. Jones, Adaptively sampled distance fields: A general representation of shape for computer graphics, ACM SIGGRAPH, 2000, pp. 249-254.

Gaede, V., and O. Günther, Multidimensional access methods, ACM Computing Surveys, 1998, vol. 30, No. 2, pp. 170-231.

Goldman, R., T. Sederberg, and D. Anderson, Vector elimination: A technique for the implicitization, inversion, and intersection of planar parametric rational polynomial curves, CAGD, 1984, vol. 1, pp. 327-356.

Govindaraju, N., M. Lin, and D, Manocha, Fast and reliable collision culling using graphics hardware, Proc. of VRST, 2004, pp. 2-9.

Greiner, G., and K. Hormann, Efficient clipping of arbitrary polygons, ACM TOG, 1998, pp. 71-83, vol. 17, No. 2.

Heckbert, P., Fundamentals of texture mapping and image warping, M.S. Thesis, 1989, UC Berkeley, Dept. of EECS.

Ho, Y., Application of minimal perfect hashing in main memory indexing, 1994, Masters Thesis, MIT.

Houston, B., M. B. Nielsen, C. Batty, O. Nilsson, K. Museth, Hierarchical RLE level set: A compact and versatile deformable surface representation, ACM Transactions on Graphics (TOG) Jan. 2006, pp. 151-175, vol. 25, No. 1.

Kraus, M., and T. Ertl, Adaptive texture maps, Graphics Hardware, 2002, pp. 7-15.

Lefebvre, S., H. Hoppe, Perfect spatial hashing, Int'l Conf. on Comp. Graphics and Interactive Techniques, 2006, pp. 579-588, Boston, Massachusetts.

Lefebvre, S., S. Hornus, and F. Neyret, Octree textures on the GPU, GPU Gems II, 2005, pp. 595-613.

Lefebvre, S., and F. Neyret, Pattern based procedural textures, Symposium on Interactive 3D Graphics, 2003, pp. 203-212.

Lefohn, A. E., J. Sengupta, J. Kniss, R. Strzodka, and J. D. Owens, Glift: Generic, efficient, random-access GPU data structures, ACM Transactions on Graphics (TOG), Jan. 2006, pp. 60-99, vol. 25, No. 1.

Loop, C., and J. Blinn, Resolution-independent curve rendering using programmable graphics hardware. ACM SIGGRAPH, 2005, 1000-1009.

Loviscach, J., Efficient magnification of bi-level textures, Int'l Conf. on Camp. Graphics and Interactive Techniques, ACM SIGGRAPH 2005.

Mehlhorn, K. 1982. On the program size of perfect and universal hash functions. Symposiumn on Foundations of Computer Science, 170-175.

Mirtich, B. 1996. Impulse-based dynamic simulation of rigid body systems. PhD Thesis, UC Berkeley.

Naor, M. and V. Teague, Anti-persistence: History independent data structures, Proc. 33rd ACM Symp. on Theory of Computing, 2001.

Östlin, A., and Pagh, R. 2003. Uniform hashing in constant time and linear space. ACM STOC, 622-628.

Pearson, P. K., Fast hashing of variable-length text strings, Communications of the ACM, Jun. 1990, pp. 677-680, vol. 33, No. 6.

Peercy, M., Olano, M., Airey, J., and Ungar, J. 2000. Interactive multi-pass programmable shading. ACM SIGGRAPH, 425-432.

Qin, Z., McCool, M., and Kaplan, C. 2006. Real-time texture-mapped vector glyphs. Symposium on interactive 3D Graphics and Games, 125-132.

Ramanarayanan, G., Bala, K., and Walter, B. 2004. Feature-based textures. Eurographics Symposium on Rendering, 65-73.

Ray, N., Cavin, X., and Lévy, B. 2005. Vector texture maps on the GPU. Technical Report ALICE-TR-05-003.

Sager, T. 1985, A polynomial time generator for minimal perfect hash functions, CACM, 1985. pp. 523-532, vol. 28, No. 5.

Schmidt, J., and Siegel, A. 1990. The spatial complexity of oblivious k-probe hash functions, SIAM Journal on Computing, 19(5), 775-786.

Sen, P., Cammarano, M., and Hanrahan, P. 2003. Shadow silhouette maps. ACM SIGGRAPH, 521-526.

Sen, P., Silhouette maps for improved texture magnification. Symposium on Graphics Hardware, 2004, pp. 65-73.

Sutherland, I., and G. Hodgman, Reentrant polygon clipping, Communications of the ACM. 1974, pp. 32-42, vol. 17, No. 1.

Tarini, M., and P. Cignoni, Pinchmaps: Textures with customizable discontinuities, Eurographics Conf., 2005, pp. 557-568.

Teschner, M., B. Heidelberger, M. Müller, D. Pomeranets, and M. Gross, Optimized spatial hashing for collision detection of deformable objects, Proc. VMV, 2003, pp. 47-54.

Tumblin, J., and P. Choudhury, Bixels: Picture samples with sharp embedded boundaries, Symposium on Rendering, 2004, pp. 186-194.

Warnock, J., A hidden surface algorithm for computer generated halftone pictures, PhD Thesis, 1969, University of Utah.

Weiler M., M. Kraus, M. Merz, and T. Ertl, Hardware-based ray casting for tetrahedral meshes, Proc. of the 14th IEEE Visualization 2003 (VIS'03), 2003, pp. 333-340.

Winner, S., M. Kelley, B. Pease, B. Rivard, and A. Yen, Hardware accelerated rendering of antialiasing using a modified A-buffer algorithm, ACM SIGGRAPH, 1997, pp. 307-316.

Winters, V., Minimal perfect hashing in polynomial time, BIT, 1990, vol. 30, No. 2, pp. 235-244.

Zobel, J., A. Moffat, and R. Sacks-Davis, Storage management for files of dynamic records, Proc. of the 4th Australian Database Conf., 1993, pp. 26-38.

* cited by examiner

PERFECT HASHING OF VARIABLY-SIZED DATA

CROSS-REFERENCE TO RELATED APPLICATIONS

This application is a Continuation-in-Part (CIP) of U.S. patent application Ser. No. 11/405,953, filed on Apr. 17, 2006, and entitled "PERFECT MULTIDIMENSIONAL SPATIAL HASHING."

BACKGROUND

1. Technical Field

The invention is related to perfect hashing for packing sparsely defined or sparsely distributed data into memory, and in particular, to perfect hashing of variable-rate data of one or more dimensions in an efficient randomly accessible format.

2. Related Art

In general, hashing is a well known technique for mapping data elements into a hash table by using a hash function to process the data for determining an address in the hash table. To cope with collisions (i.e., two or more data elements mapping to the same address in the hash table), hashing algorithms typically perform a sequence of probes into the hash table, where the number of probes varies per query. These probes provide collision detection by determining whether data has already been stored at a particular address in the hash table. Unfortunately, in time critical applications, such as image rendering in a graphics processing unit (GPU), this type of probing strategy is inefficient because GPU SIMD parallelism makes all pixels wait for the worst-case number of probes. Some GPUs can address this issue using dynamic branching; however, this is only effective if all pixels in a region follow the same branching path, which is unlikely for hash tests.

Avoiding excessive hash collisions and clustering generally requires a hash function that distributes data seemingly at random throughout the table. Consequently, hash tables often exhibit poor locality of reference, resulting in frequent cache misses and high-latency memory accesses. Perfect hashing addresses some of these problems by using a hash function that maps elements into a hash table without any collisions, such that all the elements map to distinct slots of the hash table.

In theory, perfect hash functions are rare in the space of all possible functions. In fact, the description of a minimal perfect hash function (wherein all slots in the hash table are filled) theoretically requires a number of bits proportional to the number of data entries. Consequently, it is not generally feasible to construct a perfect hash using an expression with a small number of machine-precision parameters. Instead, additional data is generally stored in auxiliary lookup tables for use in combination with the hash table.

Typical perfect hashing schemes have generally focused on external storage of data records indexed by character strings or sparse integers. Consequently, conventional perfect hashing schemes are generally not well adapted for use with spatially coherent multidimensional data. For example, in typical computer graphics applications, 2D and 3D texture data is often accessed coherently by the GPU (i.e., adjacent or nearby image patches or segments are accessed either sequentially or in parallel by the GPU). This texture data is then swizzled, tiled, cached, etc. by the GPU. Unfortunately, typical hash functions do not generally exploit the spatial coherence issues of such data when accessing that data.

Further, many images, such as, for example, vector images or graphics, involve sparsely defined spatial data. In particular, with these types of images, image discontinuities such as sharp vector silhouettes are generally present at only a small fraction of pixels. Texture sprites often overlay high-resolution features at sparse locations. Image attributes such as alpha masks are mainly binary, requiring additional resolution at only a small subset of pixels. In addition, surface textures or geometries can be also represented as sparse 3D data. Further, such data can be encoded using variable rates, such as where various cells of a grid-based vector image have a differing amount of complexity. However, compressing this type of variable-rate sparse data while retaining efficient random-access is a problem that has not been addressed by conventional perfect hashing schemes.

Spatial hashing is another conventional hashing technique that is commonly used for point and region queries in multidimensional databases. Spatial hashing is also used in graphics for efficient collision detection among moving or deforming objects. However, these techniques generally employ imperfect hashing (e.g., traditional multi-probe hash tables implemented on the CPU). Further, these techniques do not transition to multidimensional tables. Also, they strive to make intermediate hashes as random as possible. Consequently, conventional spatial hashes are not well adapted for use with sparsely defined spatial data such as vector graphics.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Variable-Rate Perfect Hasher," as described herein, extends the concepts of perfect spatial hashing described in the aforementioned co-pending U.S. patent application Ser. No. 11/405,953 to address the issue of handling variable-sized data elements of one or more dimensions. Consequently, the Variable-Rate Perfect Hasher extends perfect hashing to consider sparsely distributed data records where each sparse data record can have a different size. In other words, the data associated with the sparse data points is variable-sized. This concept is referred to herein as hashing of "variable-rate" or "variable-size" data. Note that in the parent application (U.S. patent application Ser. No. 11/405,953), perfect hashing was directed primarily towards hashing of spatially coherent fixed-rate data. However, the Variable-Rate Perfect Hasher described herein is specifically adapted for use with variably sized data elements which may or may not have some amount of spatial coherence or may be distributed randomly in space.

In general, the Variable-Rate Perfect Hasher provides a process for densely packing sparse variable-rate data into a perfect hash table. More specifically, the Variable-Rate Perfect Hasher generally operates by creating a hash table in combination with an offset table of one or more dimensions. A perfect hash is created by mapping sparse variable-rate data of one or more dimensions into the hash table using the offset table. Values of entries in the offset table are carefully chosen or optimized such that no hash collisions will occur in the resulting perfect hash table. Note that while the Variable-Rate Perfect Hasher can hash data whether or not that data is sparse, the size of the offset table directly corresponds to the sparsity of the data being hashed. In particular, as the number of data elements increases, the size of the resulting offset table will also increase.

This packing technique is ideally suited for hashing many types of sparse data since it eliminates the need to perform collision checks by ensuring a perfect hash. For example, in one embodiment, a variable-rate perfect hash is a useful data structure for providing random-access to variable-sized data elements associated with some spatial domain. One simple example of variable-rate data is a sparsely populated grid-based array of data where each populated "cell" of the grid has varying amounts of information. One such application for a 2-D case is to store information about vector graphics within the cells of an image (wherein a grid is used to divide the vector image into a set of grid-based cells). In a 1-D case, a simple example would be to store a variable-length record with a sparse set of integers in a corresponding perfect hash using an offset table.

Another application is to store image residual information after image compression. For example, as is well known to those skilled in the art, image compression is generally lossy, such that some information gets lost every time an image is encoded. This loss of detail is generally higher in regions of the image that contain greater levels of detail. Consequently, in one embodiment, rather than losing such data, the Variable-Rate Perfect Hasher encodes these areas of high detail in a sparse residual layer, which is then stored using a variable-rate perfect hash, as described herein.

Clearly, given these capabilities, the Variable-Rate Perfect Hasher is useful for a large number of applications, including, for example, computer graphics applications involving sparse data, such as sharp image silhouettes, texture sprites, alpha channel compression, 3D-parameterized textures, 3D painting, simulation, collision detection, preserving residual data following image compression, etc. However, it should also be clear that the Variable-Rate Perfect Hasher is not intended to be limited to the hashing of image data, and that any type of variable-rate data of any dimensionality can be hashed using the techniques described herein.

In view of the above summary, it is clear that the Variable-Rate Perfect Hasher described herein provides a unique system and method for mapping variable-rate data into a hash table using a perfect hash function, and that the resulting hash tables support efficient random access of the variable-sized data elements stored therein. In addition to the just described benefits, other advantages of the Variable-Rate Perfect Hasher will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
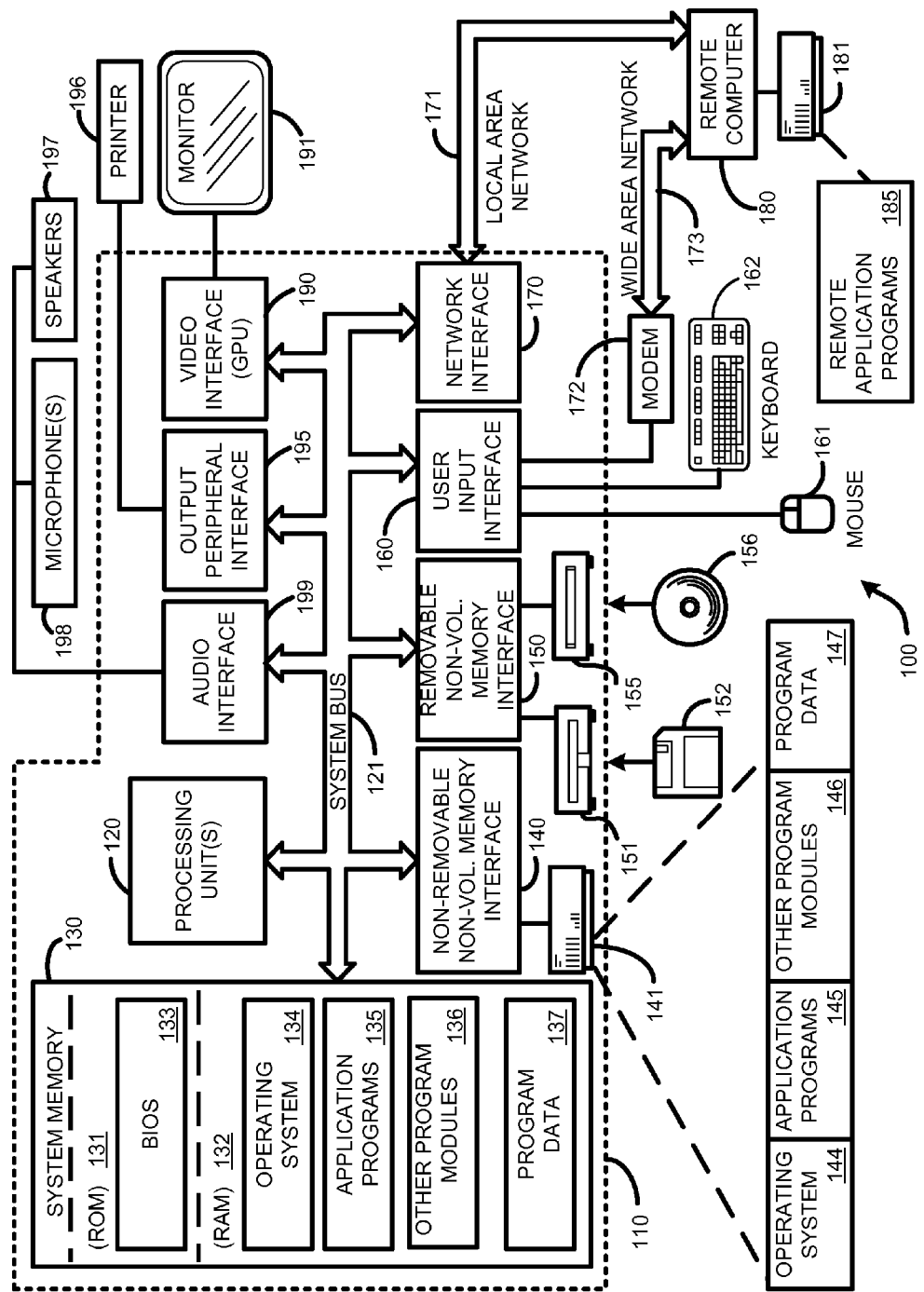
FIG. 1 is a general system diagram depicting a general-purpose computing device constituting an exemplary system for use in implementing a "Variable-Rate Perfect Hasher," as described herein.
Figure 2:
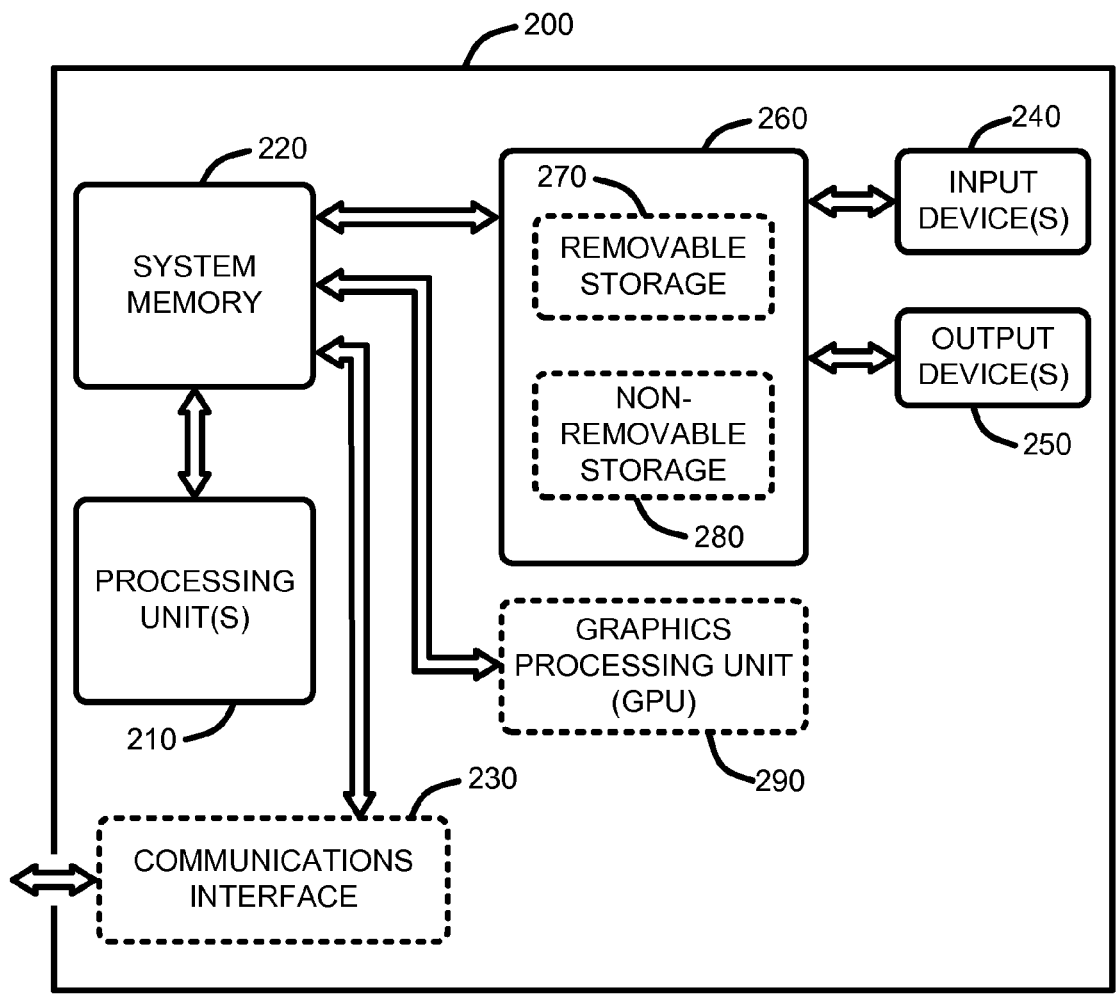
FIG. 2 is a general system diagram depicting a general device having simplified computing and I/O capabilities for use in implementing a "Variable-Rate Perfect Hasher," as described herein.

1.0 Exemplary Operating Environments:

FIG. 1 and FIG. 2 illustrate two examples of suitable computing environments on which various embodiments and elements of a "Variable-Rate Perfect Hasher," as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface or input device for receiving variable-rate data, such as, for example, vector graphic images. Such devices include, for example, cell phones, PDA's, media players, handheld, laptop or portable computers, handheld or portable electronic gaming devices, etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the functionality of the Variable-Rate Perfect Hasher, the device must have some minimum computational capability, some storage capability, an interface for allowing input and encoding of variable-rate data. In addition, this simplified computing device may also include an output device.

In particular, as illustrated by FIG. 2, the computational capability is generally illustrated by processing unit(s) 210 (roughly analogous to processing units 120 described above with respect to FIG. 1). Further, the simplified computing device of FIG. 2 may also include a graphics processing unit (GPU) 290 for use in accelerating the perfect hashing techniques described herein. Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). The simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Variable-Rate Perfect Hasher" which provides a process for densely packing sparse variable-rate data into a perfect hash table using an offset table constructed directly from the data being hashed.

2.0 Introduction:

Perfect hashing is a concept that is known to those skilled in the art. For example, a perfect hash usually refers to a hash function that maps elements into a hash table without any collisions. Generally, all the elements map to distinct slots of the hash table. The probability that randomly assigning n elements in a table of size m results in a perfect hash is given by Equation 1, where:

$$p_{PH}(n, m) = (1) \cdot \left(1 - \frac{1}{m}\right) \cdot \left(1 - \frac{2}{m}\right) \ldots \left(1 - \frac{n-1}{m}\right) \quad \text{Equation 1}$$

When the table is large (i.e., when m>>n), the probability of a perfect hash, $p_{ph}$, can be determined by using the approximation $e^x \approx 1+x$ for small x, as illustrated by Equation 2, where:

$$p_{PH}(n, m) \approx 1 \cdot e^{-1/m} \cdot e^{-2/m} \ldots e^{-(n-1)/m} \quad \text{Equation 2}$$
$$= e^{-(1+2+\ldots+n-1)/m}$$
$$= e^{-(n(n-1)/2m)}$$
$$\approx e^{-n^2/2m}$$

Thus, the presence of a hash collision is highly likely when the table size m is much less than $n^2$. This is an instance of the well-known "birthday paradox" (e.g., a group of only random 23 people have more than 50% chance of having at least one shared birthday).

The probability of finding a minimal perfect hash (e.g., where n=m) is given by Equation 3, where:

$$p_{PH}(n) = \left(\frac{n}{n}\right) \cdot \left(\frac{n-1}{n}\right) \cdot \left(\frac{n-2}{n}\right) \ldots \left(\frac{1}{n}\right) \quad \text{Equation 3}$$
$$= \frac{n!}{n^n}$$
$$= e^{(\log n! - n \log n)}$$
$$\cong e^{((n \log n - n) - n \log n)}$$
$$= e^{-n}$$

which uses Stirling's approximation: $\log n! \cong n \log n - n$. Therefore, the expected number of bits needed to describe these rare minimal perfect hash functions is given intuitively by Equation 4, where:

$$\log_2 \frac{1}{p_{PH}(n)} \cong \log_2 e^n = (\log_2 e)n \cong (1.443)n \quad \text{Equation 4}$$

Several number-theoretical methods construct perfect hash functions by exploiting the well known Chinese remainder theorem. However, even for sets of a few dozen elements, these functions involve integer coefficients with hundreds of digits. On the other hand, a more computer-amenable approach is to define the hash using one or more auxiliary tables. For example, one conventional approach uses three such tables and two nested hash functions to hash a sparse set of n integers taken from $\mathbb{Z}_u = \{0, \ldots u-1\}$. Such a scheme takes constant time and 3n log n bits of memory. The hash is constructed with a deterministic algorithm that takes O(nu) time. Another approach reduces space complexity to the theoretically optimal $\Theta(n)$ bits; however, the constant here is large and the algorithm is quite complex.

Other conventional schemes treat perfect hashing as an instance of sparse matrix compression. Such schemes map a bounded range of integers to a 2D matrix and compact the defined entries into a 1D array by translating the matrix rows. However, sparse matrix compression is known to be a NP-complete complete problem.

Other, more practical, schemes achieve compact representations and scale to larger datasets by giving up guarantees of success. These probabilistic constructions generally iterate over several random parameters until finding a solution. For example, one such scheme defines a hash as illustrated by Equation 5, where:

$$h(k)=h_0(k)+g_1[(h_1(k)]+g_2[(h_2(k)]\mod(\overline{m})$$ Equation 5 where functions $h_0$, $h_1$, and $h_2$ map string keys k to $\mathbb{Z}_m$, $\mathbb{Z}_r$, and $\mathbb{Z}_r$, respectively, and where $g_1$ and $g_2$ are two tables of size r. However, this algorithm takes expected time $O(r^4)$, and is generally considered to be practical only up to n=512 elements.

Another conventional approach to perfect hashing involves adapting the hashing scheme described with respect to Equation 5 to create provide a hashing scheme that provides generally acceptable average-case performance (~11n bits) on large datasets. The insight provided to enable this scheme is assign values of auxiliary tables $g_1$ and $g_2$ in decreasing order of number of dependencies. A closely related approach provides a hashing scheme that uses quadratic hashing and adds branching based on a table of binary values. This scheme is generally more efficient in that it achieves ~4n bits for datasets on the order of size n~$10^6$.

2.0.1 Perfect Hashing:

In general, a perfect hash which considers spatial coherence of fixed-rate data is defined using a hash function and offset table as illustrated by Equation 6, where:

$$h(p)=h_0(p)+\Phi h_1(p)$$ Equation 6 where $h_0$ and $h_1$ are both imperfect hashes that are combined using an offset table $\Phi$. Intuitively, the role of the offset table, $\Phi$, is to "jitter" the imperfect hash function $h_0$ into a perfect one. Although the offset table uses additional memory, it is significantly smaller than the data itself (e.g., it typically has only around 15-25% as many entries as the hash table itself). Further, with respect to image data, such as vector graphics, this technique can be implemented within various types of processors, such as, for example a programmable GPU, where this format for defining a perfect hash allows data access using just one additional texture access plus approximately 4-6 more shader instructions depending on the application scenario.

Unlike various conventional perfect hashing techniques that make intermediate hash functions $h_0$, and $h_1$ as random as possible, the perfect spatial hashing enabled with respect to Equation 6 instead designs these hash functions to be spatially coherent, resulting in efficient access into the offset table $\Phi$, and enabling random access into the resulting hash table. Furthermore, this perfect hashing optimizes the offset values in $\Phi$ to maximize spatial coherence of the hash table itself. Creating a perfect hash is typically a difficult combinatorial problem. However, there are enough degrees of available freedom to improve overall spatial coherence and thereby increase runtime hashing performance.

For applications that require continuous local interpolation of the sparse data, there are various approaches to perfect hashing. For example, in one embodiment, for processing sparse image data in a GPU, native filtering is used in dedicated GPU hardware by grouping the data into sample-bordered blocks. In this embodiment, traditional block indirection tables are replaced with a compact spatial hash over the sparsely defined blocks. The limiting factor in using blocks is that data must be duplicated along block boundaries, thus discouraging small blocks sizes and leading to memory bloat.

The Variable-Rate Perfect Hasher described herein further improves the perfect spatial hashing techniques summarized above by enabling perfect hashing of sparsely defined variable-rate data (i.e., perfect hashing of variable-sized data elements), with the resulting perfect hash also being applicable to each of the embodiments discussed with respect to perfect hashing of fixed-rate data.

2.1 System Overview:

As noted above, the Variable-Rate Perfect Hasher described herein operates to pack variable rate (i.e., non-uniform) sparse data into a memory structure such as a table or memory buffer. In general, this data packing is achieved using a variable-rate perfect hash technique that uses an offset table constructed from the positions or addresses of the data being hashed to provide faster hashing (no need for collision checking). Hash table addresses are computed for hashing each variable-rate data element based on parameters of each data element and a corresponding offset vector stored in the offset table. In addition, the techniques described herein also provide quicker access to specific spatial regions of the encoded data since that data can be encoded in contiguous regions of memory (i.e., the hash table) that are randomly accessible.

Further, unlike the data typically processed using conventional perfect hash functions, the data elements or records being hashed by the Variable-Rate Perfect Hasher are variable-sized and therefore stored as variable length strips or strings in the resulting hash table. In particular, conventional perfect hashing techniques operate on the assumption that data elements or records being hashed are represented by the same number of bits. However, in many real-world applications, such data elements can have variable-lengths representing varying levels of complexity or information. Consequently, in contrast to conventional hashing techniques, the Variable-Rate Perfect Hasher considers this variable length to develop a unique data structure for packing the data into memory using a technique referred to herein as "variable-rate perfect hashing."

Note that since the data elements being stored in the hash table are variable-sized and the individual storage elements, slots, or cells of the hash table are fixed in size, each hashed data element will occupy one or more contiguous storage elements in the hash table. For example, for a 2-D hash table having a plurality of rows of data, a hashed data element might take the form of a "strip" or "string" covering one or more contiguous storage elements of the hash table (and possibly wrapping across one or more rows of storage elements). This data strip would begin at the computed hash table address and continue across as many contiguous elements of the hash table as necessary to encompass the entirety of the variable-rate data element being hashed. Clearly, whether data elements are stored as strips or in some other contiguous arrangement or block of data elements in the hash table will depend upon the dimensionality of the hash table. Therefore, for purposes of discussion, hashed data elements will generally be referred to herein as a "data strip" or "data string" or simply as encompassing a contiguous block of storage elements within the hash table.

As described in greater detail in the following paragraphs, the Variable Rate Perfect Hasher is capable of hashing any type of sparsely defined variable-rate data. One simple example of this type of variable-rate data is a sparsely populated grid-based array of data where each populated "cell" of the grid has varying amounts of information. In this case, a "cell" of the grid has a known address or location that is used both in constructing the offset table used in hashing the data, and in providing random access to the corresponding data in the hash table. However, it should be noted that in view of the following discussion, the Variable-Rate Perfect Hasher is not intended to be limited to the hashing of grid-based data cells, and that any type of variable-rate data can be hashed using the techniques described herein.

Figure 3:
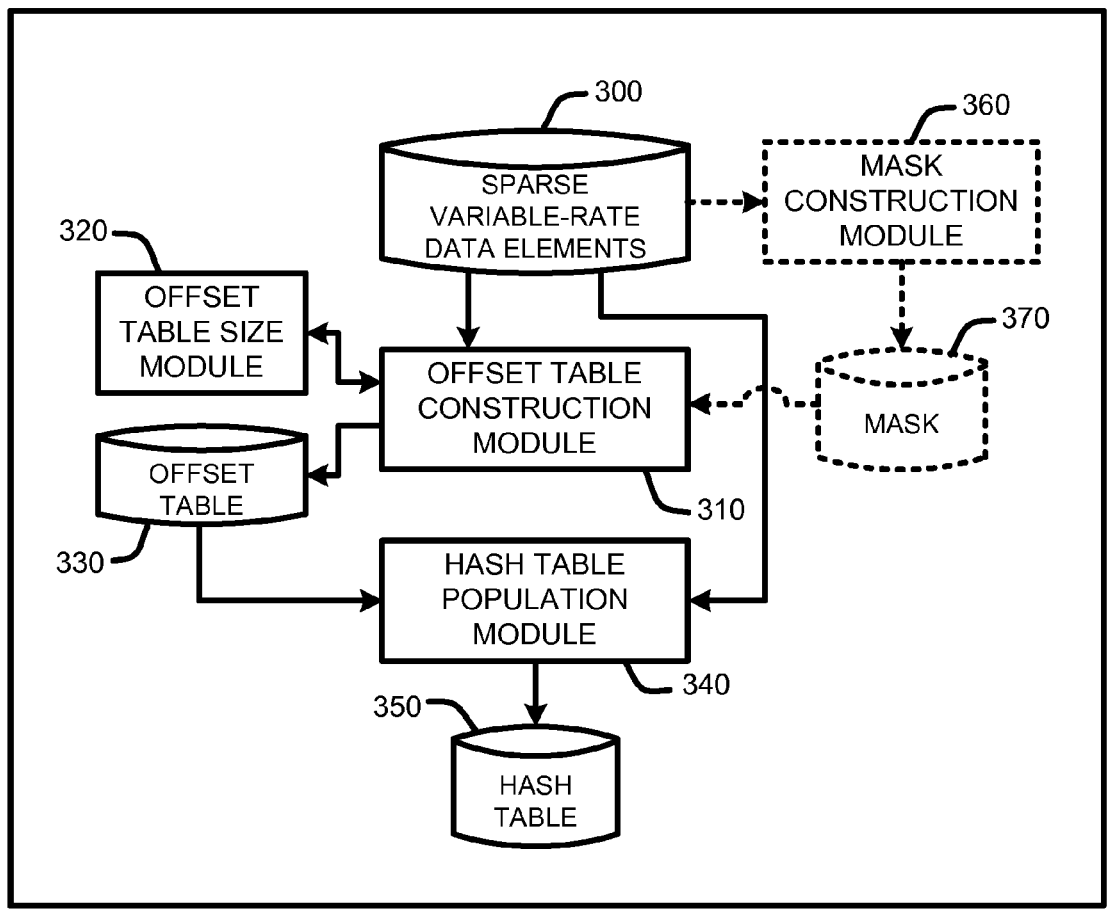
FIG. 3 provides an exemplary architectural flow diagram that illustrates program modules for implementing the Variable-Rate Perfect Hasher, as described herein.

2.2 System Architectural Overview:

The processes summarized above are illustrated by the general system diagram of FIG. 3. In particular, the system diagram of FIG. 3 illustrates the interrelationships between program modules for implementing the Variable-Rate Perfect Hasher, as described herein. It should be noted that any boxes and interconnections between boxes that are represented by broken or dashed lines in FIG. 3 represent alternate embodiments of the Variable-Rate Perfect Hasher described herein, and that any or all of these alternate embodiments, as described below, may be used in combination with other alternate embodiments that are described throughout this document.

In general, as illustrated by FIG. 3, the Variable-Rate Perfect Hasher begins operation by receiving a set of sparse variable-rate data elements 300. Again, it should be noted that the data being hashed does not need to be sparse, but that the size of the offset table will increase as the data elements become less sparse. For purposes of explanation, these data elements 300 will be described with respect to a sparsely populated grid-based array of data where each populated "cell" of the grid has varying amounts of information. An example of this type of data includes a vector image where each cell of the image represents a "domain point" that includes either no data, or some varying amount of data or information, depending upon the complexity of the cell. However, it should be understood that other types of variable-rate data elements may be used, so long as they have a determinable or known relative address or location. In any case, each of these data elements 300 can be considered as a strip of data having a length determined by the variable amount of data in the corresponding cell, where the size of the strip is equal to the size of data in that cell.

Next, the data elements 300 are provided to an offset table construction module 310. The offset table construction module 310 examines each data element 300 in combination with the address or location of that data element in the domain of data elements, and uses that information to determine an offset vector to be assigned to a corresponding entry in an offset table 330. As described in greater detail in Section 3, these offset vectors are assigned to an entry in the offset table 330 such that while two or more data elements may map to the same offset vector, there are still no collisions in the resulting hash table 350.

For example, the hash table 350 is necessarily as large as the number of data elements 300 defined in the domain since it must contain all of those data elements. However, the offset table 330 is smaller than the number of data elements since it is allowable to have two or more of those data elements mapping to the same offset vector. Thus, assigning an offset vector in the offset table 330 has the effect of displacing/translating the hash addresses of one or more data elements in the resulting hash table 350. As such, the purpose of the offset vector assignments is to have all data elements 300 map to unique hash addresses in the hash table 350 even if those data elements have the same offset vectors in the offset table 330.

To ensure that none of the offset vectors for the data elements result in hash table 350 collisions, thereby ensuring a perfect hash, the offset table construction module 310 uses a perfect spatial hash function that considers all possible offset vectors (starting from a random one) for packing the variable sized data elements or records into memory until finding an offset vector that does not create any hash collisions. A hash table construction module 340 then assigns the data strips corresponding to each data element 300 to an address in the hash table 350 computed as a joint function of the corresponding offset vector and a hash of that data element.

In particular, the offset table construction module 310 first determines the sum of the data strip sizes (assuming one or more data elements 300 mapping to the same offset vector) for all of the data elements 300 (i.e., the domain points) mapping to a particular offset table entry. Then, the sum of data strips sizes is used to determine the order in which offset vector entries are evaluated for determining hash table addresses. Specifically, the offset vectors entries are evaluated in order of decreasing sum of data strip sizes for the data elements 300 associated with each particular offset vector entry. Then, using this sum-based evaluation order, for each selected offset vector entry, the offset table construction module 310 searches over all possible offset vector value assignments until finding one that results in zero collisions with data placed so far in the hash table 340.

If no valid offset vector value is found, then an offset table size module 320 resets offset table construction to the beginning using a larger offset table size, with the processes described above then being repeated until successful construction of the complete offset table 330 and the corresponding perfect hash table 350. Note that these processes are guaranteed to terminate if the offset table becomes large enough, since at some size (depending upon the size of the data domain) each offset table entry would only reference a single domain point.

In addition, since the data elements 300 are considered sparse over the extents of the data domain, some of the data elements of the domain will not contain any data. Therefore, in one embodiment, a mask construction module 360 checks each point in the domain to determine whether the corresponding data element contains any data. A simple mask 370 is then created by the mask construction module to identify those domain points containing data (or conversely, those domain points that do not contain data). For example, in one embodiment, a single bit (i.e., "0" or "1") is assigned to every domain point to indicate whether that domain point contains any data. Then, both when constructing the offset table 330 and populating the hash table 350, the mask 370 is consulted for each point to ensure that only those domain points having data are assigned offset vectors in the offset table and hashed to the hash table. Note that as described in further detail in section 3.6 with respect to FIG. 7, the main benefit of using a mask is to improve runtime access times for evaluating or retrieving data from the hash table 350.

Further, as discussed in further detail below in Section 3.6, this mask 370 can then be used when randomly accessing data in the hash table 350. For example, in one embodiment, whenever data for a particular domain point is requested, the mask 370 is first checked to determine whether there is actually any data for the selected domain point. If the mask 370 indicates that a particular domain point does not contain any data, then no further processing of that domain point needs to be performed. On the other hand, if the mask indicates that there is data for the selected domain point, then the hash table 350 will be consulted to retrieve the corresponding data.

3.0 Operation Overview:

The above-described program modules are employed for implementing the Variable-Rate Perfect Hasher. As summarized above, the Variable-Rate Perfect Hasher operates to pack or hash variable-rate spatially coherent data into a memory structure such as a table or memory buffer in a randomly accessible format by using an offset table constructed from the data being hashed in combination with a hash function that together provide perfect hashing of the variable rate data. The following sections provide a detailed discussion of the operation of the Variable-Rate Perfect Hasher, and of exemplary methods for implementing the program modules described in Section 2 with respect to FIG. 3.

3.1 Operational Details of the Variable-Rate Perfect Hasher:

The following paragraphs detail specific operational and alternate embodiments of the Variable-Rate Perfect Hasher described herein. In particular, the following paragraphs describe perfect hashing of sparse spatially coherent fixed-rate data, as detailed in co-pending U.S. patent application Ser. No. 11/405,953. Then, given this background using fixed-rate data, a detailed discussion relating to applying these techniques to hashing of variable rate data is provided. Specifically, the following paragraphs describe details of a perfect spatial hash and general terminology used in describing perfect spatial hashing; hash construction for fixed-rate data; graphics processor unit (GPU) implementation; perfect spatial hashing of variable-rate data; and efficient random access of hashed data.

Figure 4:
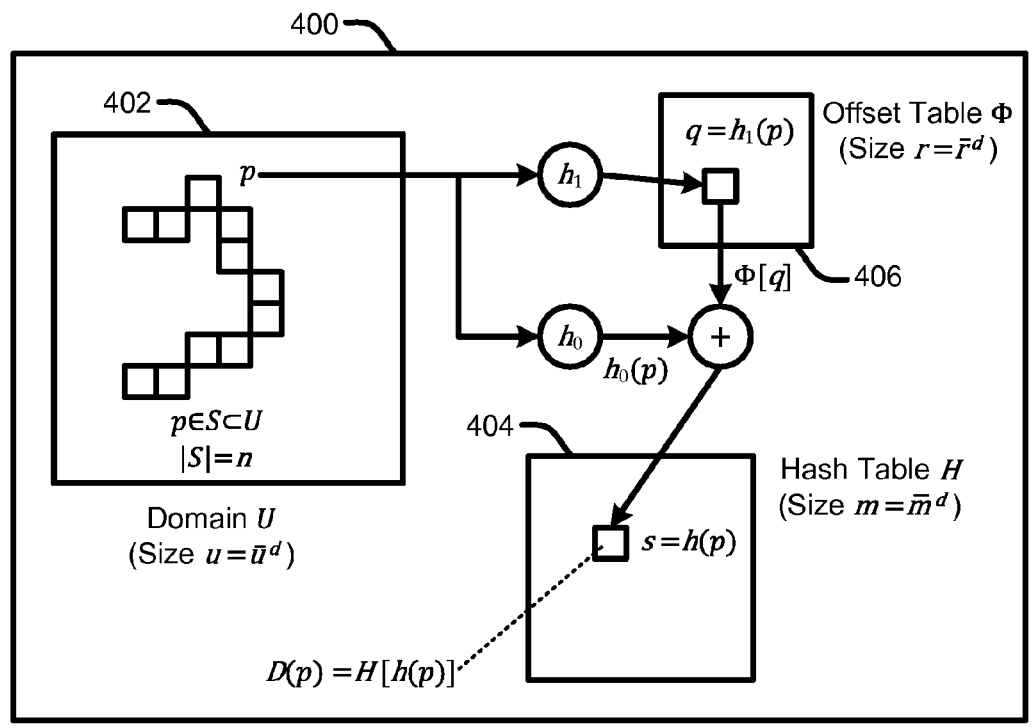
FIG. 4 provides an example of an exemplary hash function for providing a fixed-rate perfect spatial hash.
Figure 5:
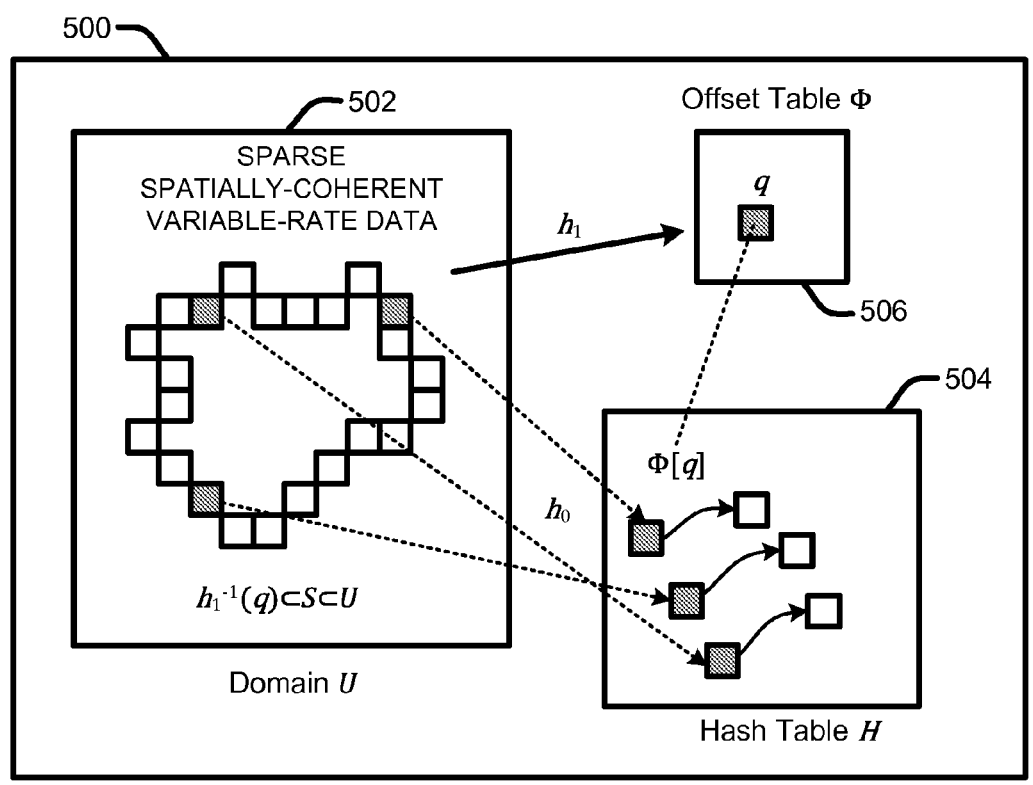
FIG. 5 provides an example of an exemplary hash function for providing a fixed-rate perfect spatial hash.

3.2 Perfect Spatial Hash Overview:

In general, FIG. 4 and FIG. 5 illustrate exemplary hash functions for providing a fixed-rate perfect spatial hash. In particular, FIG. 4 illustrates an exemplary hash function 400 having a spatial domain 402 comprising a set of sparse spatially coherent variable rate data elements or cells, a hash table 404, and an offset table 406. Assuming the spatial domain U 302 to be a d-dimensional grid with $u=\bar{u}^d$ positions, denoted by $$\mathbb{Z}\frac{d}{u} = [0\ldots(\bar{u}-1)]^d,$$

the sparse data consists of a subset $S \subset U$ of n grid positions, where each position p∈S has associated data record D(p). Thus, the data density is the fraction=n/u. For datasets of co-dimension 1, such as curves in 2D or surfaces in 3D, ρ can be typically be approximated as $\rho=1/\bar{u}$.

The basic idea with perfect spatial hashing is to replace the sparsely defined data D(p) by a densely packed hash, H[h(p)], where:

1. The hash table, H 404, is a d-dimensional array of size $m=\bar{m}^d \geq n$ containing the data records D(p), p∈S; and
2. The perfect hash function h(p): U→H is an injective map when restricted to S, mapping each position p∈S to a unique slot s=h(p) in the hash table.

As illustrated by FIG. 4, this perfect hash function is formed as in accordance with Equation 7, where:

$h(p)=(h_0(p)+\Phi[h_1(p)\bmod \bar{r}])\bmod \bar{m}$    Equation 7

In this example, the offset table Φ 406 is a d-dimensional array of size $r=\bar{r}^d \geq \sigma n$ containing d-dimensional vectors, where the factor σ is typically on the order of about 1/(2d). In addition, the map $h_0$: p→$M_0$p mod($\bar{m}$) from domain U 302 onto hash table H 302 is a simple linear transform with a d×d matrix $M_0$, modulo the table size. Finally, the map $h_1$: p→$M_1$p mod($\bar{r}$) from domain U 302 onto the offset table Φ 406 is similarly defined. Note that in general, $M_0$ and $M_1$ can be arbitrary matrices. However, it has been observed that the above-described perfect hash behaves well even when $M_0$ and $M_1$ are set to be identity matrices. While the use of identity matrices is not a requirement, one advantage of having the matrices be identity is that the runtime computations for evaluating hash table entries (see Section 3.6 and discussion of FIG. 7) is simplified. Assuming that the hash coefficients $M_0$ and $M_1$ are identity matrices, $h_0$ and $h_1$ correspond to modulo operations. In one embodiment, all modulo operations are performed per-coordinate on vectors. Therefore, one strategy is to let the hash table 404 be as compact as possible to contain the given data, and then to construct the offset table 406 to be as small as possible while still allowing a perfect hash function.

3.3 Hash Construction for Fixed-Rate Data:

In constructing a perfect hash for fixed-rate data, it is necessary to find hash table size $\bar{m}$ and offset table size $\bar{r}$, hash coefficients $M_0$ and $M_1$, and offset values in offset table Φ in a way that meets the following set of conditions:

1. h(p) is a perfect hash function for domain points p;
2. The offset table, Φ, and the hash table, H, are as compact as possible; and
3. All accesses to the offset table, $\Phi[h_1(p)]$, and the hash table $H[h(p)]$, have good spatial coherence with respect to the corresponding domain point, p.

3.3.1 Selection of Table Sizes:

As noted above, the hash table can be any dimensionality, d, that is desired. For example, a 2D hash table, with d=2, might represent an image grid, or a 3D hash table, with d=3, might represent a volumetric grid of a 3D model. Further, the sizes of the axes of the hash table can be arbitrary. However, for purposes of explanation, the following discussion assumes that all the axes of the hash table have the same size, $\bar{m}$. Therefore the total number of elements that can be stored in the hash table is $m=\bar{m}^d$. In addition, since the hash table must be at least as large as the number of data elements n, being hashed, then $m=\bar{m}^d \geq n$, where construction of the hash table inherently results in the smallest value of $\bar{m}$ given these constraints. Note that in a tested embodiment where offset values were quantized to 8-bits precision, not all of the offset values can be represented where $m=\bar{m}^d \geq n$ for values of $\bar{m} \geq 256$. However, in this case, the table size can be increased slightly to a size such as, for example, $m=\bar{m}^d \geq (1.01)n$ in order to ensure that there is enough leeway for a perfect hash. Note that in either case, larger sizes of $\bar{m}$ can be used; however the use of larger sizes will increase memory requirements.

Next, a size, $\bar{r}$, is selected for the offset table size. Again, the size of $\bar{r}$ is selected to be as small as possible while still permitting a perfect hash. Note that larger sizes of $\bar{r}$ can be used; however the use of larger sizes will increase memory requirements. The size of $\bar{r}$ can selected in several ways.

For example, in one embodiment, a value of $\bar{r}$ is selected based on whether the speed of hash construction is important for a particular application. In particular, for fast construction of the offset table, the value of $\bar{r}$ is initially set to the smallest integer such that $r=\bar{r}^d \geq \sigma n$, with the factor σ=1/(2d). Note that this size corresponds to 4 bits per data entry, and allows a perfect hash in many cases. However, if the hash construction fails, the size of $\bar{r}$ is increased in a geometric progression until construction succeeds.

Alternately, for the most compact construction, a binary search over $\bar{r}$ is performed to determine the smallest size. Because construction of the offset table is greedy and probabilistic, finding a perfect hash for a given offset table size $\bar{r}$ may require several attempts, particularly if $\bar{r}$ is close to optimal. In a tested embodiment, the number of binary search attempts is limited to a relatively small number on the order of about 5, in order to improve performance of hash table construction. In each case, the search attempts are made using different random seeds.

It has been observed that hash construction is less effective if $\bar{r}$ has a common factor with $\bar{m}$, or if $(\bar{m} \bmod \bar{r}) \in \{1, \bar{r}-1\}$. Consequently, in one embodiment, the fast table construction embodiment automatically skips any offset table sizes for $\bar{r}$ that fall into this range. Similarly, with respect to the compact table construction embodiment, the binary search is adapted to avoid values of $\bar{r}$ in this range unless at the lower end of the range.

3.3.2 Selection of Hash Coefficients:

In one embodiment, the hash coefficient matrices $M_0$ and $M_1$, for hash functions $h_0$ and $h_1$, respectively, are filled with random prime coefficients. However, better hashing performance is achieved by making these matrices more regular.

Specifically, allowing the hash coefficient matrices $M_0$ and $M_1$ to be identity matrices does not significantly hinder the construction of a perfect hash. In this case, the functions $h_0$ and $h_1$ simply wrap the spatial domain multiple times over the offset and hash tables, moving over domain points and table entries in lockstep. As a result, the offset table access $\Phi[h_1(p)]$ is perfectly coherent. Although $h_0(p)$ is also coherent, the hash table access $H[h(p)]$ is generally not coherent because it is jittered by the offsets. However, if adjacent offset values in $\Phi$ are the same (e.g., if the offset table is locally constant), then h itself will also be coherent. See Section 3.3.4 for additional discussion regarding these coherence issues.

One necessary condition on functions $h_0$ and $h_1$ is that they must map the defined data to distinct pairs. In other words, $p \in S \rightarrow (h_0(p), h_1(p))$ must be injective. Note that an injective function is one which associates distinct arguments to distinct values such that a function $f$ is injective if it maps distinct values of x in the domain to distinct values of y in the codomain, such that $f(x)=y$. Note that, given two points $(p_1, p_2) \in S$, with $h_0(p_1)=h_0(p_2)$ and $h_1(p_1)=h_1(p_2)$, then these points would always hash to the same slot, i.e., $h_1(p_1)=h_2(p_2)$, regardless of the offset stored in $\Phi[h_1(p_1)]$ making a perfect hash impossible.

Consequently, the condition for injectivity is similar to a perfect hash of n elements into a table of size $|H| \times |\Phi|=mr$. A probability of success, $p_{ph}$, for a perfect hash, can be computed as illustrated by Equation 8, where:

$$p_{ph} \approx e^{-n^2/(2mr)} = e^{-n/2r} \qquad \text{Equation 8}$$

This probability, $p_{ph}$ is typically a fairly low probability, e.g., only about 12% for $\sigma=r/n=0.25$. For this reason, conventional perfect hashing schemes often resort to additional tables and hash functions to improve the probability of a perfect hash.

However, in contrast to conventional perfect hashing schemes, the perfect spatial hashing described herein does not involve selecting $h_0$ and $h_1$ to be random functions. In fact, because the functions $h_0$ and $h_1$ have periodicities $\bar{m}$ and $\bar{r}$ respectively, if these periodicities are co-prime then they guarantee injectivity when the domain size $\bar{u} \leq mr$, or equivalently (since $m \approx n$) when the data density $\rho=n/u \geq 1/r$. In practice, r is typically large enough that this is always true. Consequently, it is not strictly necessary to explicitly test for injectivity.

3.3.3 Offset Table Creation:

FIG. 5 illustrates the effect on the hash function of changing one offset value in the offset table. For example, FIG. 5 illustrates a hash function environment 500 having a spatial domain 502 comprising a set of sparse spatially coherent variable rate data elements or cells, a hash table 504, and an offset table 506. On average, each entry q of the offset table 406 is the data through $h_1$ of $\sigma^{-1}=n/r \approx 4$ data points, i.e., the set $h_1^{-1}(q) \subset S$. The assignment of the offset vector $\Phi[q]$ (also referred to herein as an "offset value") determines a uniform translation of these points within the hash table 504. The general idea here is to find a hash assignment that does not collide with other points already hashed into the table 404.

Those entries $\Phi[q]$ with the largest sets $h_1^{-1}(q)$ of dependent data points are most difficult to assign to the hash table. Consequently, these values are processed first. Offset values are assigned using a "greedy" approach according to this heuristic order (e.g., computed efficiently using a bucket sort). In particular, for each entry q, a search for an offset value $\Phi[q]$ is made such that the data entries $h_1^{-1}(q)$ do not collide with any data previously assigned in the hash table 404, as illustrated by Equation 9, where undefined (i.e. unassigned) values in the hash table are identified as follows:

$$\forall p \in h_1^{-1}(q), H[h_0(p) \Phi[q]] = undef \qquad \text{Equation 9}$$

Assuming the use of 8-bits for quantizing offset values, the space of offset values is $\mathbb{Z}_{min(\bar{m}/256)}^{d} \lceil \bar{m}/255 \rceil$. Note that towards the end of construction, the offset entries considered are those with exactly one dependent point, such as $|h_1^{-1}(q)|=1$. For these cases, offset values are identified that direct these sole points to any open hash slots.

Note that in the example of FIG. 5, three data elements, shown as the three shaded boxes in spatial domain 502, map to the same location $q=p \bmod \bar{r}$ in the offset table 506. Therefore, the assignment of offset vector $\Phi[q]$ has the effect of translating the final hash addresses, $h(p)=(p+\Phi[p \bmod \bar{r}]) \bmod \bar{m}$, of those three elements to new locations in the hash table 504. For fixed-rate data, the idea is to assign all offset vectors in $\Phi$ such that the final hash addresses $h(p)=(p+\Phi[p \bmod \bar{r}]) \bmod \bar{m}$ of all defined elements p are unique in the hash table 504. In contrast, with variable-rate data (as discussed in further detail in Section 3.5), the additional constraint is that not only the start address h(p) in the hash table must be unique for each data element, but the (variable-length) strips for the data elements cannot overlap each other.

3.3.4 Optimization of Hash Coherence:

As noted above, when $M_1$ is defined as an identity matrix, accesses to the offset table $\Phi$ are always coherent. The following paragraphs describe how hash construction is optimized to increase coherence of access to H.

First, in the case where hash queries are constrained to the set of defined entries $S \subset U$, then $N_S(p_1, p_2)$ is "1" if two defined points, $p_1, p_2 \in S$, are spatially adjacent in the domain (i.e., $\|p_1-p_2\|=1$), or "0" otherwise. In addition, in this case, $N_H(s_1, s_2)$ is similarly defined for slots in H. Given these parameters, $N_H$ is maximized as illustrated by Equation 10, where:

$$N_H = \sum_{p_1,p_2|N_S(p_1,p_2)=1} N_H(h(p_1), h(p_2)) \qquad \text{Equation 10}$$

$$= \sum_{p_1,p_2|N_H(h(p_1),h(p_2))=1} N_S(p_1, p_2)$$

This second expression for $N_H$ is then measured during hash construction. When assigning an offset value $\Phi[q]$, rather than simply selecting any valid value, values that maximize coherence are selected. In particular, the slots of H into which the points $h_1^{-1}(q)$ map are examined, ant the number of neighbors in H that are also neighbors in the spatial domain are counted, as illustrated by Equation 11, where:

$$\max_{\Phi[q]} C(\Phi[q]), \qquad C(\Phi[q]) = \sum_{p \in h_1^{-1}(q), \|\Delta\|=1} N_S\left(\binom{h^{-1}h_0(p)+}{\Phi[q]+\Delta}, p\right) \qquad \text{Equation 11}$$

While a brute force approach for testing every possible value for $\Phi[q]$ is performed in one embodiment, it is generally more computationally efficient to limit the number of candidates being tested. Consequently, in one embodiment, possible values for $\Phi[q]$ are limited using the following heuristics:

1. First, try setting the offset value, $\Phi[q]$, to be equal to one stored in a neighboring entry of the offset table, because the hash function is coherent if the offset table is locally constant, as illustrated by Equation 12, where:

$$\Phi[q]\epsilon\{\Phi[q']|\|q-q'\|<2\} \quad \text{Equation 12}$$

2. For each point $p\epsilon h_1^{-1}(q)$ associated with q, the domain-neighboring entries $p'\epsilon S$ are examined. If a neighbor p' is already assigned in the table H, the table is evaluated to see if any immediately neighboring slot in H is free, and if so, the offset, $\Phi[q]$, that would place point p in that free slot is tested, as illustrated by Equation 13, where:

$$\Phi[q]\epsilon\{h[p']+\Delta-h_0(p)|p\epsilon h_1^{-1}(q),\, p'\epsilon S,\, N_S(p,p')=1,\, h(p')\ne undef,\, \|\Delta\|=1,\, H[h(p')+\Delta]=undef\} \quad \text{Equation 13}$$

In the case that hash queries span the full domain U, then local constancy of $\Phi$ is most important. Therefore, in this case, preference is given to the candidates found using Equation 13, as illustrated above.

In addition, in one embodiment, as a post-process, any undefined offset entries (i.e., for which $h_1^{-1}(q)=\emptyset$) are assigned values coherent with their neighbors using a normalized coherence metric such as $\acute{N}_H=N_H/\Sigma_{p_1,p_2}N_S(p_1,p_2)$.

3.3.5 Sparsity Encoding:

The hash table generally stores data associated with a sparse subset of the overall domain. Depending on the application, it may be necessary to determine if an arbitrary query point lies in this defined subset. In other words, since the data is sparse, some arbitrary data points within the overall domain may not contain any data. Consequently, as noted above, in various embodiments, when an arbitrary point within the domain is selected for random access (either by a user, or automatically) the Variable-Rate Perfect Hasher first determines whether that particular point includes any data.

Some data access scenarios, such as 3D-parameterized surface textures, guarantee that only the defined subset of the domain (i.e., points having data) will ever be accessed. In this case, it is not necessary for the Variable-Rate Perfect Hasher to determine whether a selected point has data before attempting to retrieve that data from the hash table.

However, for scenarios involving unconstrained access, where any point in the total domain may be selected, whether that point includes data or not, a binary image (i.e., the aforementioned "mask," see FIG. 3, for example) over the domain is constructed such that each bit of the mask indicates the presence of data (or blocks of data) in the corresponding hashed data. One advantage of this embodiment, is that when using a GPU to process hashed data representing an image, a dynamic branch can be performed in the shader of the GPU based on the stored mask bit, to completely bypass the hash function evaluations and texture reads ($\Phi$, H) for any undefined pixels.

In the case that the particular GPU being used lacks support for single-bit textures, the above described mask-based embodiment can still be enabled by packing each 4×2 block of domain bits into one pixel of an 8-bit luminance image. Then, to dereference the bit, a lookup is performed in a corresponding 4×2×256 texture.

In contrast, if a non-sparse image is already defined over the domain, a related embodiment operates to hide domain bits within this image for one or more points of the domain. For example, such data can be included as the least-significant bit of a color or alpha channel, or in some other location where it will not change modify other data. This use of a hidden bit is convenient to indicate the presence of sparse supplemental data beyond that in the normal image. For example, as is well known to those skilled in the art, image compression is generally lossy, such that some information gets lost every time an image is encoded. This loss of detail is generally higher in regions of the image that contain greater levels of detail.

Consequently, in one embodiment, rather than losing such data, the Variable-Rate Perfect Hasher encodes these areas of high detail in a sparse residual layer, which is then stored using a variable-rate perfect hash, as described herein. Then, when decoding or rendering that image, the bits hidden in the image indicate whether the stored residual information is to be used for a particular point in the image. Note that the reference to a "point" here, and throughout this document, does not necessarily refer to an individual pixel, and that as described above, a "point" within the overall domain simply represents some region or subset of the overall domain. Therefore, in the case of an image, a "point" in the domain can represent one or more pixels, depending upon a level of zoom and a size of the image and the cells or points in the domain.

When the data is very sparse, storing even a single bit per domain point may take significant memory. Consequently, in one embodiment, the Variable-Rate Perfect Hasher includes a tag in each slot of the hash table to identify the domain position $\hat{p}$ of the stored data. Then, given a query point, the Variable-Rate Perfect Hasher can then simply compare it with the stored tag.

In particular, encoding a position $\hat{p}\epsilon U$ requires a minimum of $\log_2 u$ bits. The position tags can be stored in an image with d channels of 16 bits, thus allowing a domain grid resolution of $\bar{u}$=64K. Such position tags are more concise than a domain bit image if $d\cdot 16\cdot m < 1\cdot u$, or equivalently, if the data density $n/u<1/(16d)$.

3.4 GPU Implementation:

As noted above, various embodiments of the Variable-Rate Perfect Hasher can be implemented within a programmable graphics processing unit (GPU) which is designed for fast access to array-based data. For example, by using arrays with integer coordinates (e.g., 0, 1, ..., $\bar{m}-1$) and integer values to define the hash and offset tables, GPUs can be used to accelerate construction of hashes and access to hashed data. In particular, when using a GPU, these arrays can be implemented in the form of 2D or 3D textures with normalized coordinates $$\left(e.g., \frac{0.5}{\bar{m}}, \frac{1.5}{\bar{m}}, \ldots, \frac{\bar{m}-0.5}{\bar{m}}\right)$$

and normalized colors $$\left(e.g., \frac{0}{255}, \frac{1}{255}, \ldots, \frac{255}{255}\right).$$

Quantizing the offset vectors stored in the offset table, $\Phi$, to 8 bits per coordinate provides enough flexibility for hashing even when the hash table size $\bar{m}$ exceeds $2^8=256$. Therefore, $\Phi$ is represented as a d-channel 8-bit image for processing by the GPU. However, to avoid bad clustering during hash construction, it is important to allow the offsets to span the full hash table, so the stored integers, $\mathbb{Z}_{256}{}^d$, are scaled by $\lceil \overline{m}/255 \rceil$.

This idea is represented by the high-level shading language (HLSL) pseudo-code for the exemplary hashing function, as shown in Table 1:

TABLE 1

Pseudo-Code for Hashing in a GPU

```
static const int d=2;           // spatial dimensions (2 or 3)
typedef vector<float,d> point;
#define tex(s,p) (d==2 ? tex2D(s,p) : tex3D(s,p))
sampler SOffset, SHData; // tables Φ and H.
matrix<float,d,d> M[2]; // M₀, M₁ prescaled by 1/m̄, and 1/r̄,
respectively.
    point ComputeHash(point p) { // evaluates h(p) → [0, 1]ᵈ
    point h0 = mul(M[0],p);
    point h1 = mul(M[1],p);
    point offset = tex(SOffset, h1) * oscale; // (* ⌈m̄/255⌉)
    return h0 + offset; }
float4 HashedTexture(point pf) : COLOR {
    // pf is prescaled into range [0, ū] of space U
    point h = ComputeHash(floor(pf));
    return tex(SHData, h); }
```

In various embodiments, several additional optimizations of the pseudo-code illustrated in Table 1 are implemented. For example, for 2D domains, the two matrix multiplications (i.e., (mul(M[i],p)) are performed in parallel within a float4 tuple. In addition, in another embodiment, since the matrices $M_0$ and $M_1$ are in fact scaled identity matrices, the matrix multiplications are reduced to a single multiply instruction.

3.5 Perfect Spatial Hashing of Variable-Rate Data:

The basic ideas and for perfect spatial hashing for fixed-rate data described above cannot be directly used for variable-rate data (i.e., data elements having variable sizes). However, several of the above described processes are modified, as described in further detail below, to enable the Variable-Rate Perfect Hasher to handle such data. It should be noted that extending these capabilities to address variable-rate data also enables each of the additional fixed-rate embodiments described above to be performed using variable-rate data.

In general, as with fixed rate data, to enable processing of variable-rate data, the Variable-Rate Perfect Hasher, the hash function is again defined using an offset table. In other words, the location of the hashed data elements within the hash table are determined by adding the original cell position of the variable rate-data element to an offset vector retrieved from the offset table. Similarly, both the first access to the offset table and the subsequent access into the hash table are performed using modulo addressing (also referred to as "wrap-around addressing"), as described herein.

In general, construction of the offset table proceeds in a similar manner to that described in Section 3.3. For example, for each offset table entry, the Variable-Rate Perfect Hasher assigns an offset vector, $\Phi[q]$, such that the hashed data elements for the domain points that map to that offset table entry do not collide with hashed data elements for any other domain point.

For fixed-rate data, a greedy heuristic algorithm, as described above, operated to assign offset vectors in order of decreasing number of dependencies. In other words, offset table entries onto which the most domain points mapped for the fixed-rate data case were identified and assigned those offset vectors first. In contrast, this general strategy is extended to variable-rate data by instead considering the sum of the data record sizes for the domain points mapping to a particular offset table entry.

For example, for each selected offset vector entry, the Variable-Rate Perfect Hasher searches over all possible offset vector value assignments until finding one that results in zero collisions with data placed so far in the hash table. If no valid offset vector value is found, then the process is aborted, and a larger offset table size is used in repeating the search for offset vector value assignments, and so on until no collisions occur.

More specifically, assuming that e(p) denotes a variable strip size of some variable-rate cell or data element p. Then, the hash, h(p), is defined using a 2D offset table $\Phi$, such that the hash function h(p) is given by Equation 14, where:

$$h(p)=(p+\Phi[p \bmod(\overline{r})]) \bmod(\overline{m}) \quad \text{Equation 14}$$

where $\overline{r}$ and $\overline{m}$ are the dimensions of the offset table, $\Phi$, and the hash table, h, respectively.

The construction of the offset table $\Phi$ uses a heuristic strategy wherein offset vectors $\Phi[q]$ are assigned in order of decreasing number of dependent data elements. Then, rather than counting the number $|h_1^{-1}(q)|$ of dependent data records, where $h_1(p)=p \bmod(\overline{r})$, the Variable-Rate Perfect Hasher instead counts the total data size $\Sigma_{p \in h_1^{-1}(q)} e(p)$ of the dependent records, with that size then being used in construction of the offset table. In particular as noted above, two or more data elements may map to the same offset vector. Therefore, to ensure that none of the offset vectors for the data elements result in hash table collisions the sum of the data strip sizes (assuming one or more data elements map to the same offset vector) is used to determine the order in which offset vector entries are evaluated for determining hash table addresses. Specifically, as noted above, the offset vectors entries are evaluated in order of decreasing sum of data strip sizes for the data elements associated with each particular offset vector entry.

Then, using this sum-based evaluation order, to assign the offset vectors, $\Phi[q]$, for this variable-rate case, the Variable-Rate Perfect Hasher considers all possible offset vectors (starting from a random one) until finding one that does not create any hash collisions. In one embodiment, spatial coherence of the data elements is considered by attempting to place hashed data strips adjacent to each other by first performing the traversal until finding an invalid offset vector (i.e., one resulting in a collision) and then looking for the first (and thus closest) valid offset vector.

3.5.1 Data Structure for Variable-Rate Data:

It has been observed that data structures do not generally support efficient random access to variable-sized data records. However, the data structures created by the Variable-Rate Perfect Hasher are an exception to this observation. In particular, as noted above, each domain cell p of the hash table contains a variable-size data record e(p), wherein the size $e(p) \geq 0$, with a value of "0" representing no data for a particular data record. Consequently, the total data size, E, for all records stored in the hash table is given by Equation 15, where:

$$E = \Sigma_p |e(p)| \quad \text{Equation 15}$$

Note that the size of each data record is encoded in the data itself, so the data structure need to explicitly store |e(p)|. Alternately, |e(p)| can be encoded in the hashed data string so that data size can be explicitly read from that data. However, this embodiment will require some small amount of additional data to be included in the hashed data strings.

Similarly to the fixed-rate examples described above, the total number of defined cells (i.e., cells that have some data) is given by Equation 16, where:

$$n = \Sigma_{p, |e(p)|>0} 1 \quad \text{Equation 16}$$

In other words, the number of defined cells, n, is simply a count of the total number of cells in the sparse domain that have some non-zero data.

Therefore, m≈E, m≧E, and r∝n, where, as described above, r and m are the sizes of the offset table, Φ, and the hash table, h, respectively. In other words, the size, r, of the offset table for use with variable rate data is proportional to the number of cells, n, in the sparse domain having non-zero data. Further, the size, m, of the hash table is approximately equal to, but never less than, the total size, E, of the non-zero data records.

As noted above, each data record is stored as a strip, e(p), of some variable length, within the 2D hash table. The perfect hash function points to the beginning of the strip. As noted above, offset vector values, Φ[q], are assigned in order of decreasing number of "dependencies". However, rather than counting the number $|h^{-1}(q)| = \Sigma_{p \in h_1^{-1}(q)} 1$ of dependent data records, it has been observed that, in practice, better results are achieved by counting the total data size $\Sigma_{p \in h_1^{-1}(q)} e(p)$ of these records.

Then, when considering the assignment of an offset vector, q, the Variable-Rate Perfect Hasher checks that for each dependent domain cell, $p \in h_1^{-1}(q)$, the resulting strip in the hash table is currently empty along the entire length of that strip. Equation 17 illustrates a definition of the strip address range as a function of strip length in the hash table for a 2D case, where:

$$H\left[h(p) + \begin{pmatrix} 0 \\ 0 \end{pmatrix}\right] \ldots H\left[h(p) + \begin{pmatrix} |e(p) - 1| \\ 0 \end{pmatrix}\right] \quad \text{Equation 17}$$

As discussed above in Section 3.3, in the fixed-rate data case, it was observed that hash construction is less effective if $\bar{r}$ has a common factor with $\bar{m}$, or if $(\bar{m} \bmod \bar{r}) \in \{1, \bar{r}-1\}$. Further, also as discussed above, since the functions $h_0$ and $h_1$ have periodicities $\bar{m}$ and $\bar{r}$ respectively, if these periodicities are co-prime then they guarantee injectivity when the domain size $\bar{u} \leq \bar{mr}$, or equivalently (since m≈n) when the data density $\rho = n/u \geq 1/r$.

However, in contrast to the fixed-rate case described above, a least common multiple condition, i.e., $\bar{u} \leq \text{lcm}(m,r)$, is no longer a complete guarantee that $h_0$ and $h_1$ cannot collide. In fact, given this condition, it is theoretically possible that domain cells $p_1$ and $p_2$ can exist that map onto the same offset table entry and whose hash table strips at least partially overlap, such that: $p_1 \bmod(\bar{r}) = p_2 \bmod(\bar{r})$ and $(p_1 + i_1) \bmod(\bar{m}) = (p_2 + i_2) \bmod(\bar{m})$, where $0 \leq i_1 < |e(p_1)|$ and where $0 \leq i_2 < |e(p_2)|$. However, since hashed data strips lie along rows, this theoretically invalid configuration (involving collisions) can only occur if $p_1$ and $p_2$ lie in the same domain row. It has been observed that in practice, this doesn't seem to be a significant problem. Therefore, while the Variable-Rate Perfect Hasher can test for this condition in various embodiments, it is generally not necessary.

Finally, with respect to sparsity encoding, in one embodiment, the Variable-Rate Perfect Hasher uses a domain bit array to encode which cells contain no data (as with the aforementioned mask-based embodiment). Alternatively, in the image case, cells having no data are simply encoded in the hash table by entering a data string corresponding to a fully transparent color into the hash table, with a low-resolution color image being used to predict constant-color cells.

Figure 6:
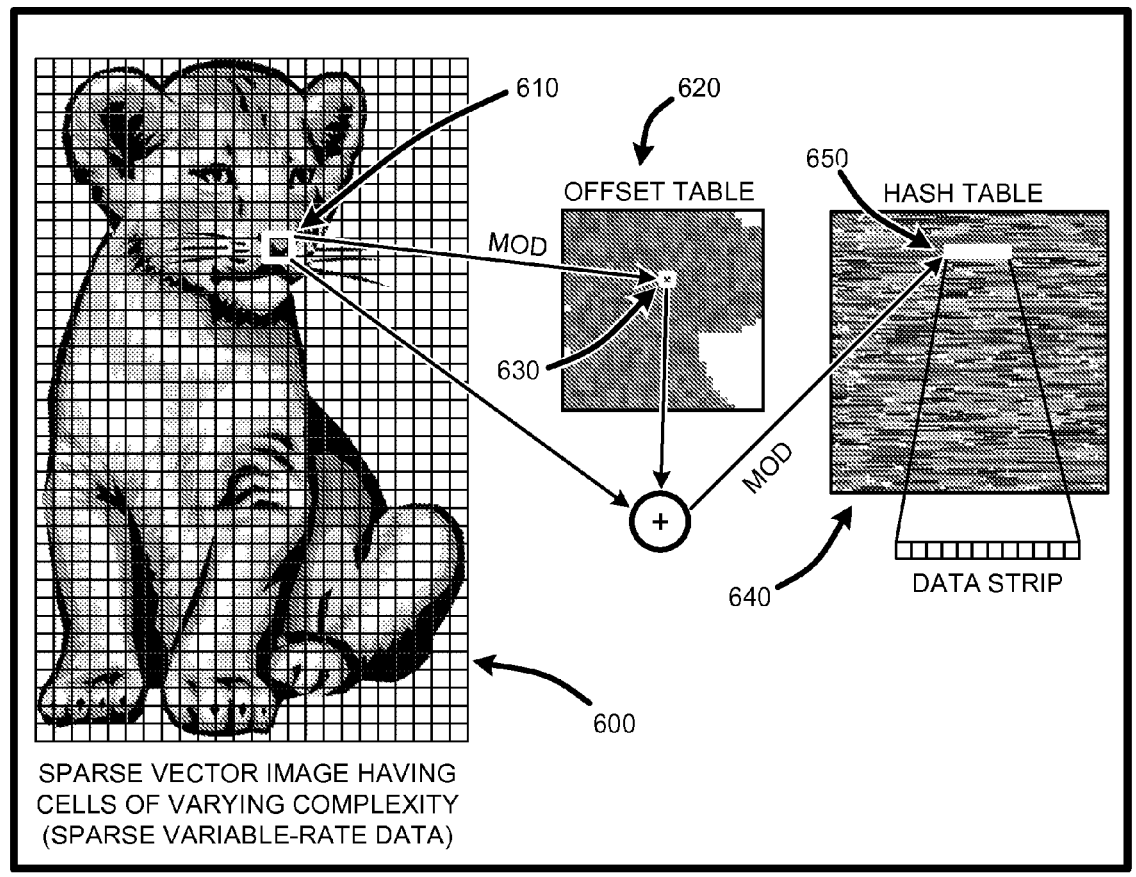
FIG. 6 illustrates an exemplary vector image comprised of grid-based cells representing sparse variable-rate data being perfectly hashed to a hash table via an offset table computed from the cell data, as described herein.

FIG. 6 illustrates an example of 2-D variable rate data being perfectly hashed to a hash table via an offset table. In particular, FIG. 6 illustrates a vector image 600 divided into a grid of cells have a differing amount of complexity in each cell. For each particular cell, i.e., cell 610, an offset table 620 address 630 is determined, as described above, with an offset vector being computed and stored at that offset table address. Then, this offset table vector 630 is used in combination with the address of the cell 610 to determine a corresponding hash table 640 address 650 for storing the hashed data from the cell 610 of the vector image 600.

3.6 Efficient Random Access of Hashed Data:

Once that sparse variable rate data has been entered into the hash table, as described above, the remaining issues deal with accessing or reading out that data for particular applications. As noted above, one of the many advantages of the Variable-Rate Perfect Hasher is that the data structures created when hashing sparse variable-rate data enable efficient random access to particular data cells or blocks of data cells.

Figure 7:
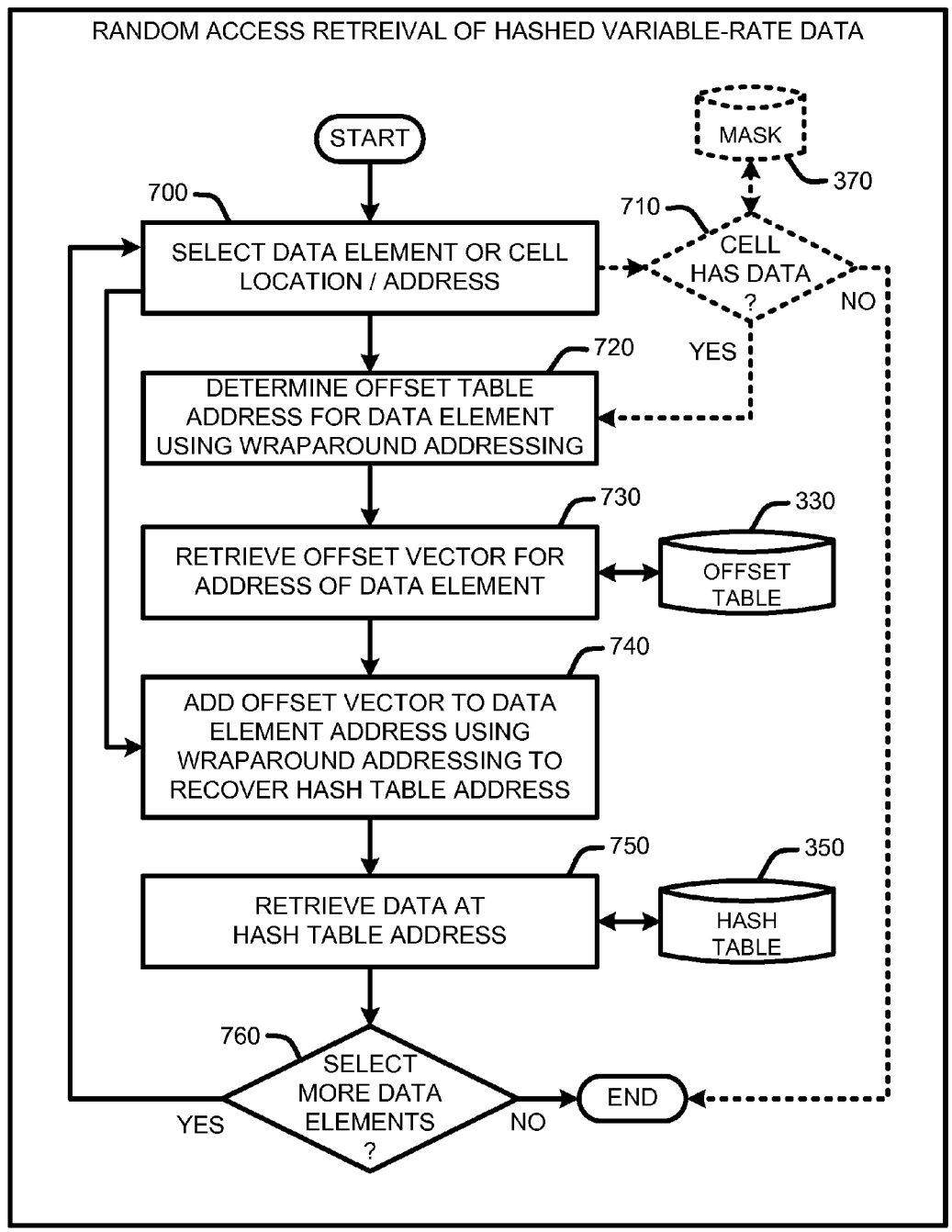
FIG. 7 provides an exemplary operational flow diagram for providing efficient random access to a hash table constructed from sparse variable-rate data by the Variable-Rate Perfect Hasher, as described herein.

FIG. 7 provides an exemplary flow diagram that illustrates efficient random access of hashed variable-rate data. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

In particular, as illustrated by FIG. 7, random access to the hashed variable-rate data (included in hash table 350) begins be either manually or automatically selecting 700 a cell or range of cells of the data domain for which the corresponding data is to be retrieved from the hash table. Note that this selection 700 is made by selecting a location or address of particular cells or data elements, since this location or address is used in hashing the data as described above.

In one embodiment, the Variable-Rate Perfect Hasher first checks the mask 370, to determine 710 whether the selected cell has any data. If the mask 370 indicates that the selected cell does not have any data, then the process terminates, and the Variable-Rate Perfect Hasher informs the calling application that the selected cell is undefined (i.e., that it has no data).

On the other hand, assuming that either the mask 370 is not checked 710, or that this check indicates that the selected cell has data, then the Variable-Rate Perfect Hasher determines 720 the corresponding offset table 330 address directly from the address of the selected cell. As described above, this address is determined using a wraparound (i.e., modulo) addressing technique.

Given the offset table 330 address for the selected cell, the Variable-Rate Perfect Hasher then simply retrieves 730 the corresponding offset vector from the offset table. This offset vector is then added to the address of the selected cell, again using a wraparound (i.e., modulo) addressing technique to recover 740 the corresponding hash table 350 address.

Given the hash table 350 address, the Variable-Rate Perfect Hasher then simply retrieves 750 the data string corresponding to the selected cell from the hash table. As noted above, these strings are either self terminating or otherwise include a length such that the Variable-Rate Perfect Hasher knows when to stop reading data for the selected cell. This is an important issue since the data records are variable sized, resulting in the variable length strings described above.

Finally, the Variable-Rate Perfect Hasher then checks 760 to determine whether there are any more selected cells for which data is to be retrieved, and if not, the process terminates. On the other hand, if more cells have been selected 700, then the above described random access processes described above are simply repeated for each selected cell.

The foregoing description of the Variable-Rate Perfect Hasher has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Variable-Rate Perfect Hasher. It is intended that the scope of the invention be limited not by this detailed description, but rather by the claims appended hereto.

What is claimed is:

1. A process for hashing variable-sized data, comprising:
using a computing device for:
receiving set of variable-sized data elements;
for each data element, computing a corresponding offset vector address from an address of the data element;
for each offset vector address, computing a corresponding offset vector for populating an offset table;
for each data element, computing a corresponding hash table address from a combination of the address of the data element and the corresponding offset vector; and
hashing each data element to a contiguous block of one or more storage locations in the hash table beginning with the corresponding hash table address, wherein the number of storage locations in each contiguous block is dependent upon the size of the corresponding variable-sized data element being hashed.

2. The process of claim 1 wherein each computed offset vector ensures a perfect hash of the corresponding data element by ensuring that there are no collisions between any data elements being hashed to the hash table.

3. The process of claim 2 wherein computing the corresponding hash table address from a combination of the address of the data element and the corresponding offset vector further comprises:
adding a size of all data elements having the same corresponding offset vector address to create a composite sum for each offset vector address; and
evaluating each offset vector address in order of highest to lowest composite sum when computing the corresponding hash table address.

4. The process of claim 1 wherein computing the offset vector for each offset vector address comprises evaluating all possible offset vectors starting from a random offset vector until finding an offset vector for the corresponding data element that does not create any hash collisions based on a size of the corresponding data element.

5. The process of claim 1 wherein computing the offset vector for each offset vector address comprises placing hashes of spatially coherent data elements as close as possible to each other in the hash table by evaluating all possible offset vectors for each data element until identifying an invalid offset vector that results in a hash table collision, then identifying the closest offset vector to the invalid offset vector that does not result in a collision based on a size of the corresponding data element.

6. The process of claim 1 further comprising randomly accessing one or more the data elements by:
selecting an address of one or more of the data elements;
computing the corresponding offset vector addresses for the selected data elements;
retrieving the corresponding offset vector for each offset vector address from the offset table;
computing the corresponding hash table address for each data element from the retrieved offset vector and the data element address; and
retrieving the hashed data element from the hash table using the corresponding hash table address.

7. The process of claim 1 further comprising computing a binary mask over a domain representing a spatial extent of the data elements to indicate whether each data element contains any information.

8. The process of claim 7 further comprising using the mask to exclude all data elements not having any information from being used to compute offset vectors and to exclude those data elements from hashed to the hash table.

9. The process of claim 1 wherein the sparse, spatially coherent variable-rate data elements represents a grid-based representation of an image, and wherein each cell of the grid has variable-rate image data.

10. The process of claim 9 wherein the hash table is stored into a memory buffer of a graphics processing unit (GPU), and wherein the selected regions of the image are rendered by the GPU by providing GPU-based random access to hashed data elements within the hash table corresponding to the selected regions of the image.

11. A tangible computer-readable storage device having computer executable instructions stored thereon for perfectly hashing image data into a hash table, said computer executable instructions comprising:
receiving a sparse grid-based image comprised of a plurality of neighboring cells, wherein a subset of the cells contain variable-rate image data and wherein the remaining cells do not contain data;
computing a binary mask over the grid-based image to identify each cell of the subset of cells that contain variable-rate image data;
in accordance with the binary mask, for each cell that contains variable-rate image data, determining a cell address and computing a corresponding offset vector address, each said offset vector address corresponding to one or more of the cells;
for each offset vector address, computing a corresponding offset vector for populating a corresponding entry in an offset table;
in accordance with the binary mask, for each cell that contains variable-rate image data, computing a corresponding hash table address from a sum of the cell address and the corresponding offset vector; and
in accordance with the binary mask, for each cell that contains variable-rate image data, hashing the contents of each cell to a contiguous block of one or more storage locations within the hash table beginning with the corresponding hash table address, wherein the number of storage locations in each contiguous block is dependent upon the size of the corresponding variable-rate image data being hashed.

12. The tangible computer-readable storage of claim 11 wherein each computed offset vector ensures a perfect hash of the variable-rate image data for the one or more corresponding cells by ensuring that there are no collisions between any data of any of the cells being hashed to the hash table.

13. The tangible computer-readable storage of claim 11 wherein computing the offset vector for each offset vector address comprises evaluating all possible offset vectors starting from a random offset vector until finding an offset vector for the one or more corresponding cells that does not create any hash collisions based on a size of the variable-rate image data in each corresponding cell.

14. The tangible computer-readable storage of claim 11 wherein computing the offset vector for each offset vector address comprises placing hashes of variable-rate image data of spatially coherent cells as close as possible to each other in the hash table by evaluating all possible offset vectors for each cell until identifying an invalid offset vector that results in a hash table collision, then identifying the closest offset vector to the invalid offset vector that does not result in a collision based on a size of the variable-rate image data in the corresponding cell.

15. The tangible computer-readable storage of claim 11 further comprising randomly accessing the variable-rate image data of one or more selected cells:
- selecting an address of one or more of the cells;
- computing the corresponding offset vector addresses for the selected cells and retrieving the corresponding offset vector for each computed offset vector address from the offset table;
- computing the corresponding hash table address for each selected cell from the retrieved offset vector and the corresponding cell address; and
- retrieving the hashed data variable-rate data for each selected cell from the hash table using the corresponding hash table address.

16. The tangible computer-readable storage of claim 15 further comprising instructions for storing the hash table into a memory buffer of a graphics processing unit (GPU), and wherein selected regions of the image are rendered by the GPU by providing GPU-based random access to hashed variable-rate data of the selected cells.

17. A method for performing a perfect hash of data sparsely populating a domain, comprising: using a computing device for:
- receiving set of variable-rate data elements, each data element corresponding to a populated data point within a sparse data domain;
- determining an address for each populated data point and computing a corresponding offset vector address, each offset vector address corresponding to one or more of the populated data points;
- computing and storing a corresponding offset vector for each offset vector address, wherein each computed offset vector ensures a perfect hash of the corresponding variable-rate data element of each of the corresponding populated data points;
- for each populated data point, computing a corresponding hash table address from a sum of the data point address and the corresponding offset; and
- hashing the spatially coherent variable-rate data element of each populated data point to a contiguous block of one or more storage locations within a hash table beginning with the corresponding hash table address, wherein the number of storage locations in each contiguous block is dependent upon the size of the corresponding variable-rate data element being hashed.

18. The method of claim 17 wherein computing the offset vector for each offset vector address comprises evaluating all possible offset vectors starting from a random offset vector until finding an offset vector for each of the one or more corresponding data point that does not create any hash collisions.

19. The method of claim 17 wherein computing the offset vector for each offset vector address comprises placing hashes of spatially coherent variable-rate data elements of the corresponding populated data points as close as possible to each other in the hash table by evaluating all possible offset vectors for each data point until identifying an invalid offset vector that results in a hash table collision, then identifying the closest offset vector to the invalid offset vector that does not result in a collision.

20. The method of claim 17 further comprising randomly accessing the spatially coherent variable-rate data elements of one or more selected data points by:
- determining the address of each selected data point;
- computing the corresponding offset vector addresses for the selected data points and retrieving the stored corresponding offset vector for each computed offset vector address;
- computing the corresponding hash table address for each selected data point from the retrieved offset vector and the corresponding data point address; and
- retrieving the hashed spatially coherent variable-rate data elements for each selected data point from the hash table using the corresponding hash table address.

\* \* \* \* \*